United States Patent [19]
Gehn et al.

[11] Patent Number: 5,873,204
[45] Date of Patent: *Feb. 23, 1999

[54] CART WITH MULTI-POSITION DOORS

[75] Inventors: William Gehn, Red Wing; Patrick Geraghty, Minneapolis; James E. Kovacs; Robert J. Grimm, both of Lakeville, all of Minn.

[73] Assignee: Cannon Equipment Company, Rosemount, Minn.

[*] Notice: This patent issued on a continued prosecution application filed under 37 CFR 1.53(d), and is subject to the twenty year patent term provisions of 35 U.S.C. 154(a)(2).

[21] Appl. No.: 552,834

[22] Filed: Nov. 3, 1995

[51] Int. Cl.$^6$ .................................................. E06B 1/04
[52] U.S. Cl. ........................... 52/204.1; 292/175; 49/503
[58] Field of Search ................................. 52/204.51, 207; 49/394, 503; 292/145, 174, 175; 280/79.3, 79.11

[56] References Cited

U.S. PATENT DOCUMENTS

| | | | |
|---|---|---|---|
| 2,726,095 | 12/1955 | Emery | 280/79.2 |
| 3,893,686 | 7/1975 | Morgan . | |
| 3,953,047 | 4/1976 | Morgan . | |
| 4,263,749 | 4/1981 | McDougle | 49/394 |
| 5,271,334 | 12/1993 | Sweet . | |
| 5,437,537 | 8/1995 | Sweet . | |
| 5,480,184 | 1/1996 | Binning | 280/79.3 X |

FOREIGN PATENT DOCUMENTS

| | | | |
|---|---|---|---|
| 476970 | 3/1992 | European Pat. Off. | 280/79.3 |

Primary Examiner—Creighton Smith
Attorney, Agent, or Firm—Sten Erik Hakanson

[57] ABSTRACT

The present invention comprises a cart having a base and three sidewalls extending there around and upward therefrom. Four wheels are secured at bottom corners of the sidewalls to provide for easy mobility of the cart. A pair of partial doors are hingedly secured to and extend along end edges of two opposing sidewalls for permitting partial coverage of a fourth side of the cart. Each partial door includes a spring biased manually operable pin for cooperating with a plurality of slots in the cart base. In this manner the doors can be positioned from an orientation substantially coextensive with a front edge of the cart base, to positions wherein the doors are oriented inwardly of the cart loading interior space. Each door is secured to its respective sidewall in a manner wherein it can be lifted a distance sufficient to lift the pin thereof free from and above the base slots. Thus, the doors can be moved and positioned by either operating the pins manually to clear the slots, and then releasing the pin for insertion within the desired slot, or they can be lifted in their entirety and then let down to position the pins in the desired slots. The base front edge also has an inwardly angled portion along the length thereof that angles up to a horizontal shoulder. The horizontal shoulder includes the first pair of the plurality of pin retaining slots. A vertical portion then rises from the level of the shoulder to the level of the main area of the cart base. This angled structure permits a third means for operating the doors, wherein they can be slammed closed. In this mode, the end of the pin rides up on the angled portion when the door is closed with sufficient force, thereby overcoming the biasing force of the spring. The pins of each door will then insert into the first slots in the shoulder area. The vertical edge prevents any further movement of the doors inwards as the pins thereof are blocked thereby.

24 Claims, 8 Drawing Sheets

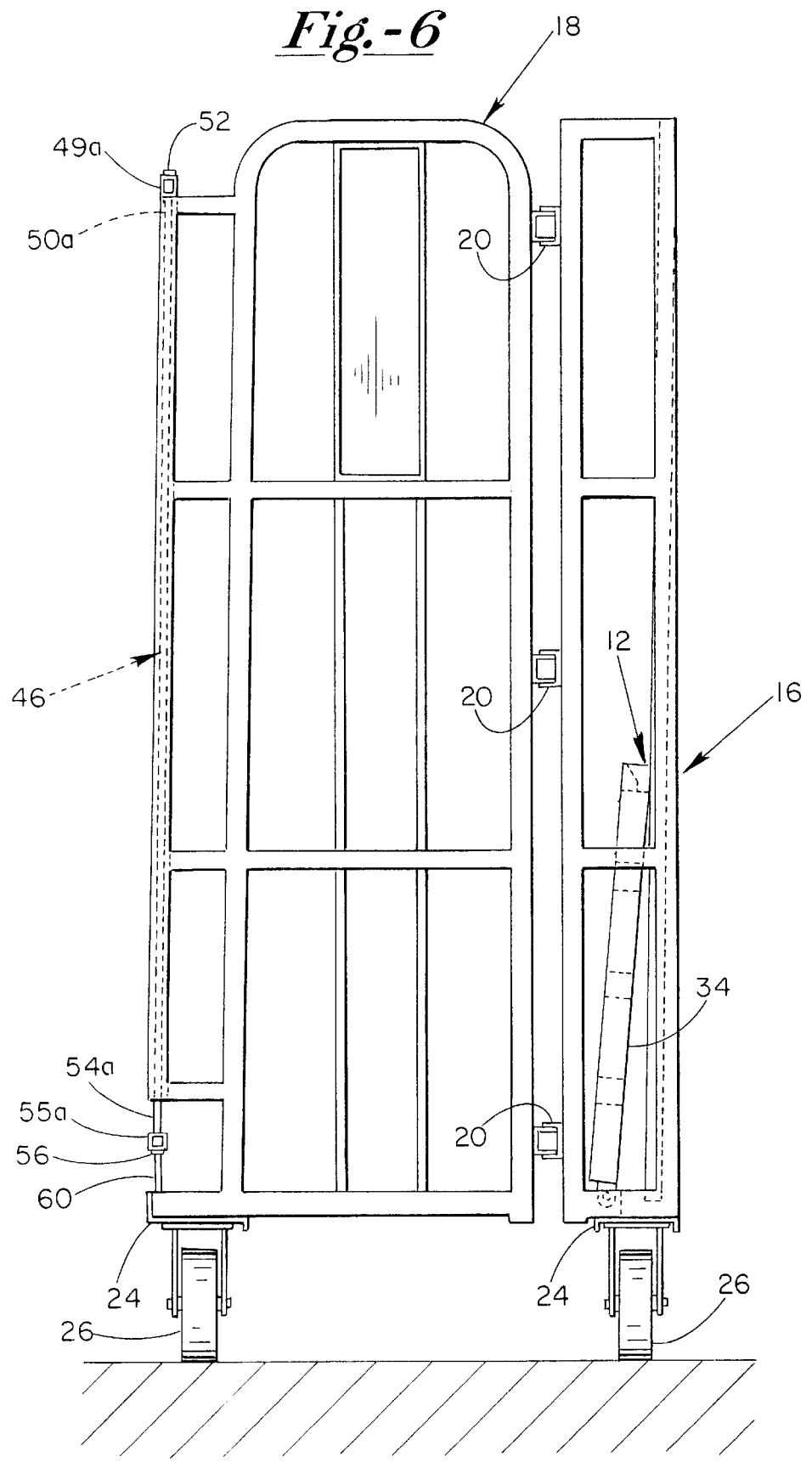

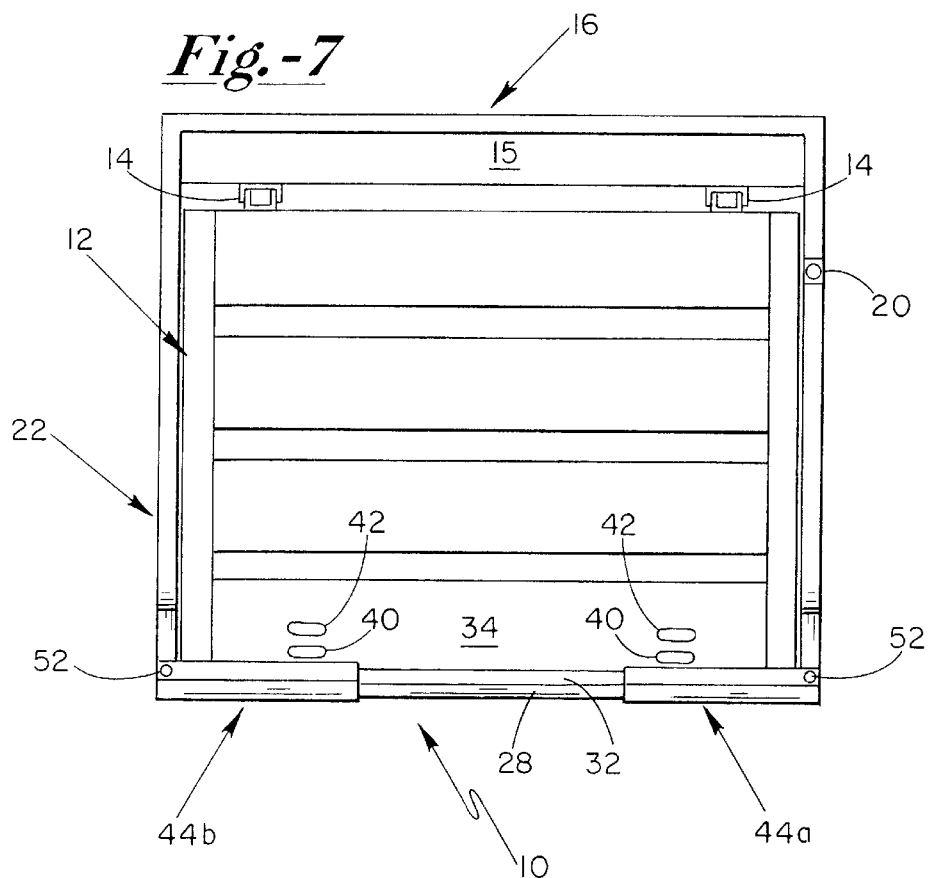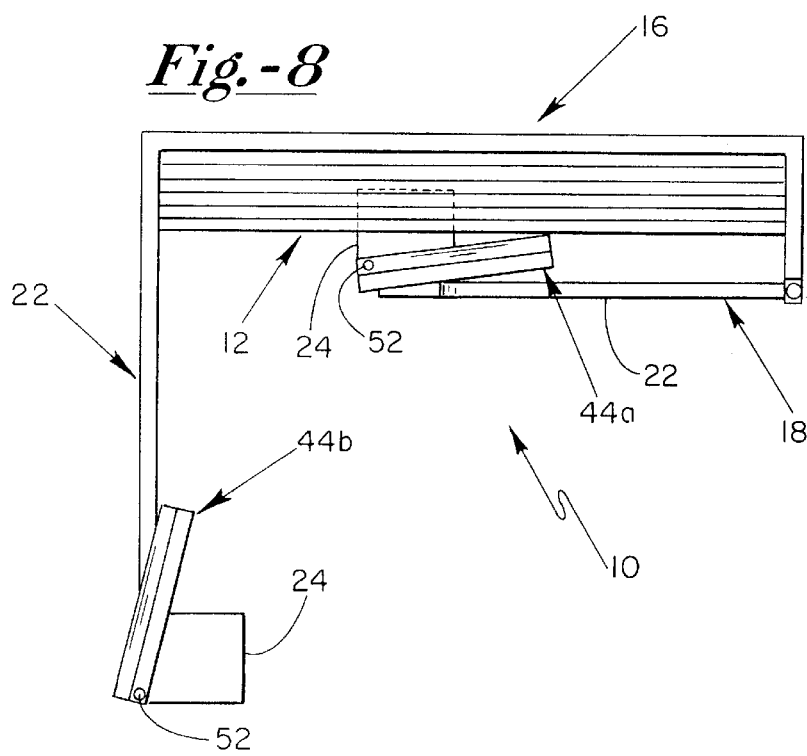

CART WITH MULTI-POSITION DOORS

BACKGROUND OF THE INVENTION

1. Field of the Invention

The present invention relates generally to carts, and in particular to carts that are easily loaded, unloaded and transported.

2. Background

Wheeled carts are well known in the art and are utilized to transport a wide variety of goods. Such carts typically include a base having wheels at each of the four corners thereof. Three vertical sidewalls can extend upward from the base with the fourth side comprising some form of door for permitting loading of goods into the cart and retaining of them therein during transport thereof.

In the case of carts used for the transport of newspaper bundles, such as seen in U.S. Pat. No. 5,437,537, straps can be used to retain the bundles in the cart in lieu of a door. Opening and closing a door latch mechanism can pose a manipulating problem for the automatic equipment that is used to load newspaper bundles. In addition, newspaper bundles can vary in size and shape and pose difficulties for a single position door to retain them securely within the confines of the cart. However, straps entail an additional manual step in securing them together around the load. Automatic banding of the bundles after loading in the cart is also known, but this requires the additional expense and maintenance of the banding equipment. Also, the bands require a manual step in that they must be cut so that the cart can be unloaded, and there is the additional problem of disposing of the waste material represented by the cut bands.

Accordingly, it would be desirable to have a cart that can be easily operated manually or by automatic loading equipment, and that eliminates the need for straps or banding, or the like.

SUMMARY OF THE INVENTION

The present invention comprises a cart having a base and three sidewalls extending there around and upward therefrom. Four wheels are secured at bottom corners of the sidewalls to provide for easy mobility of the cart. A pair of partial doors are hingedly secured to and extend along end edges of two opposing sidewalls for permitting partial coverage of a fourth side of the cart. As is known in the art, the cart herein can be folded into an L-shape wherein the base is folded against a rear sidewall and one of the opposing sidewalls is then folded against the base. In this manner the cart can be stacked after unloading for more efficient use of space when transporting back to the loading facility.

Each partial door includes a spring biased manually operable pin for cooperating with a plurality of slots in the cart base. In this manner the doors can be positioned from an orientation substantially coextensive with a front edge of the cart base, to positions wherein the doors are oriented inwardly of the cart loading interior space. Each door is secured to its respective sidewall in a manner wherein it can be lifted a distance sufficient to lift the pin thereof free from and above the base slots. Thus, the doors can be moved and positioned by either operating the pins manually to clear the slots, and then releasing the pin for insertion within the desired slot, or they can be lifted in their entirety and then let down to position the pins in the desired slots.

The base front edge also has an inwardly angled portion along the length thereof that angles up to a horizontal shoulder. The horizontal shoulder includes the first of the plurality of pin retaining slots. A vertical portion then rises from the level of the shoulder to the level of the main area of the cart base. This structure permits a third means for operating the doors, wherein they can be "slammed" closed. In this mode, the end of the pin rides up on the angled portion when the door is closed with sufficient force, thereby overcoming the biasing force of the spring. The pins of each door will then insert into the first slots in the shoulder area. The vertical edge prevents any further movement of the doors inwards as the pins thereof are blocked thereby.

Thus, the doors of the cart herein can be opened and closed by manual or machine lifting of the entire door, or manual operation of the pins thereof to remove or insert the pins into and out of the positioning slots. The cart doors can also be quickly closed to the position that permits the greatest loading area within the cart by simply slamming the doors shut. It will be appreciated by those of skill that positioning of the door pins in the further slots inward of the first slot position permits more tight securing of the contents thereof by pressing of the doors there against. This can be accomplished manually after loading of the cart.

DESCRIPTION OF THE DRAWINGS

A further understanding of the structure function, operation, and advantages of the present invention can be had by referring to the following detailed description which refers to the following figures, wherein:

FIG. 6 shows a side plan view along lines 6—6 of FIG. 3 with the base in the folded position.

FIG. 7 shows a top plan view of the present invention.

FIG. 8 shows a top plan view of the present invention in the filly folded configuration.

DETAILED DESCRIPTION OF THE INVENTION

Figure 2:
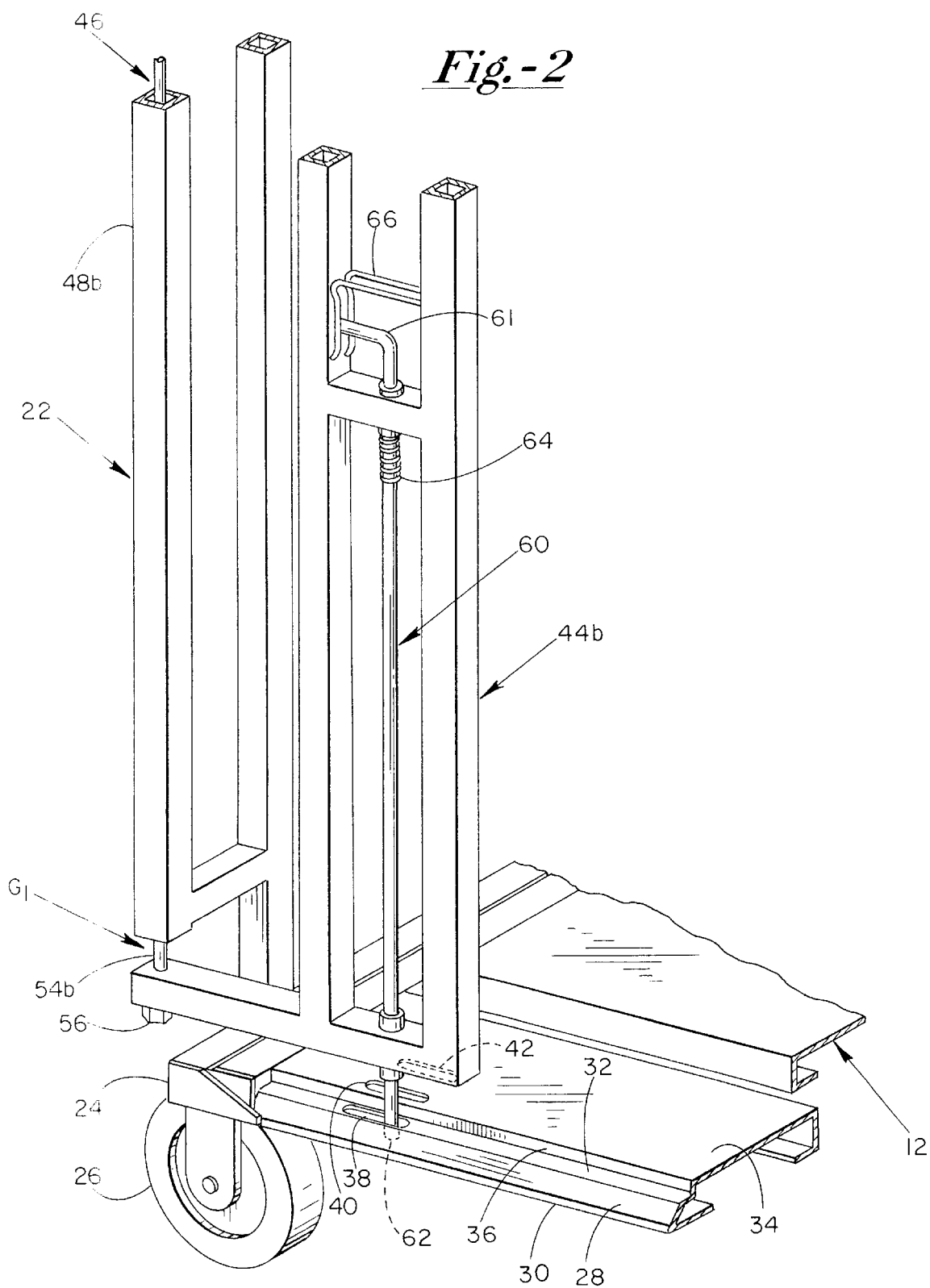
FIG. 2 shows an enlarged perspective view of the present invention.

The cart of the present invention is seen in the various FIGS. and generally indicated by the numeral 10. Cart 10 includes a base 12 secured by hinges 14 to a rear frame piece 15 that is secured to a rear wall 16. Rear wall includes a plurality of vertically extending frame members 17a and 17b. Members 17a and 17b have no cross bracing so that the spaces 17c there between are continuous and unobstructed. To provide for sufficient structural strength of rear wall 16 in lieu of any cross bracing thereof, members 17a and 17b utilize a larger dimensioned channel bar than would be suitable with cross bracing. A first opposing side wall 18 is secured by hinges 20 to rear wall 16. A second opposing sidewall 22 is secured to and integral with rear wall 16. It will be appreciated by those of skill that either or both sidewalls 18 and 22 could be integral with rear wall 16 or hingedly secured thereto. Sidewalls 18 and 22 and rear wall 16 include bottom support framing 24 to which four caster or swivel wheels 26 are secured. As seen by particularly referring to FIG. 2, base 12 includes an angled front edge surface 28 extending between opposite edges of base 12 and at an upward directed angle from a front edge 30 to a horizontally extending shoulder 32. Shoulder 32 resides at a level below a main top surface area 34 of base 12 being separated therefrom by a difference represented by a vertically extending surface 36. A pair of lower pin receiving oblong holes or slots 38 extend through shoulder 32. Two further pairs of such pin receiving slots 40 and 42 extend through base main surface area 34.

Sidewalls 18 and 22 each have doors 44a and 44b respectively, hingedly mounted thereto. In particular, a long rod 46 extends through channel bar frame portions 48a and 48b respectively of each sidewall 18 and 22. Top ends 50a and 50b of each rod 46, also extend through top door channel portions 49a and 49b, and each top end 50a and 50b have a washer 52 rigidly secured thereto. Lower rod ends 54a and 54b extend through lower door channel portions 55a and 55b and are threaded for receiving lock nuts 56 thereon.

Doors 44a and 44b each include L-shaped locking rods 60 having handle portions 61 and pin ends 62. Rods 60 are slidably mounted to doors 48a and 48b and each include springs 64 mounted thereon for biasing rods 60 in a downward direction. Each door 44a and 44b include rigid handles 66 that facilitate manual operation of handle ends 61 so that rods 60 can be moved in an upward direction opposite to the direction of the spring biasing thereof.

Figure 1:
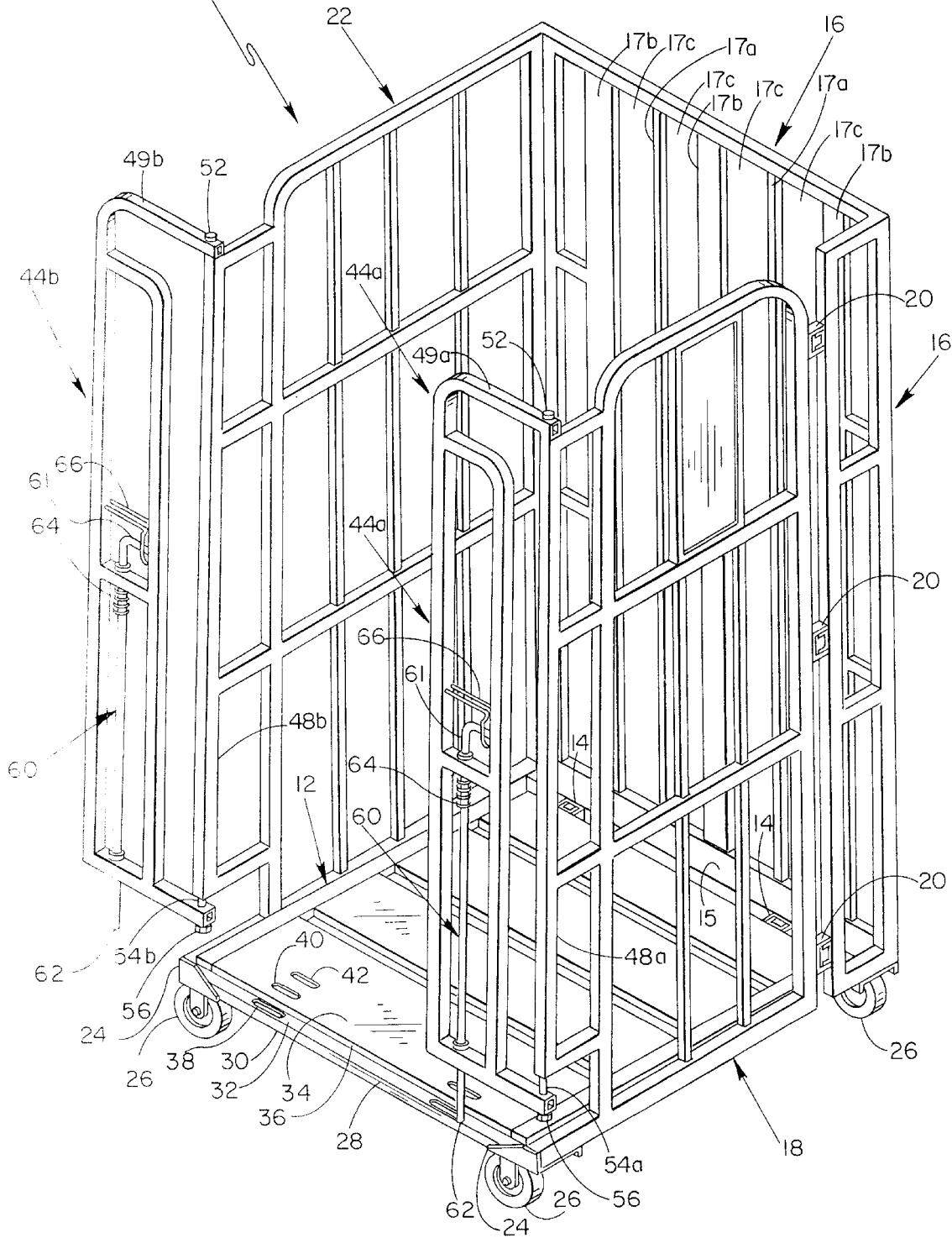
FIG. 1 shows perspective view of the present invention.

In operation, doors 44a and 44b can be positioned so that the respective pin ends 62 of rods 60 thereof can be inserted into slots 38, 40 or 42 thereby retaining doors 44a or 44b in a particular position. When in slots 38, as will be understood by referring to FIGS. 2 and 4, both doors 44a and 44b extend along shoulder 32. When in slots 40 or 42, it will be appreciated by those of skill that doors 44a and 44b are positioned inward of shoulder 32 and progressively towards back wall 16. Doors 44a and 44b can be so positioned or moved to a fully open position as seen with door 44b in FIG. 1, by manually grasping around handles 66 and pulling rod ends 61 in a direction there against. In this manner, pin ends 62 are withdrawn from slots 38, 40 or 42. Doors 44a and 44b are then free to swing to any position with respect to the limits of their hinged attachment to sidewalls 18 and 22. Naturally, release of rods 60 permits their re-insertion in slots 38, 40 or 42 as is desired.

Figure 3:
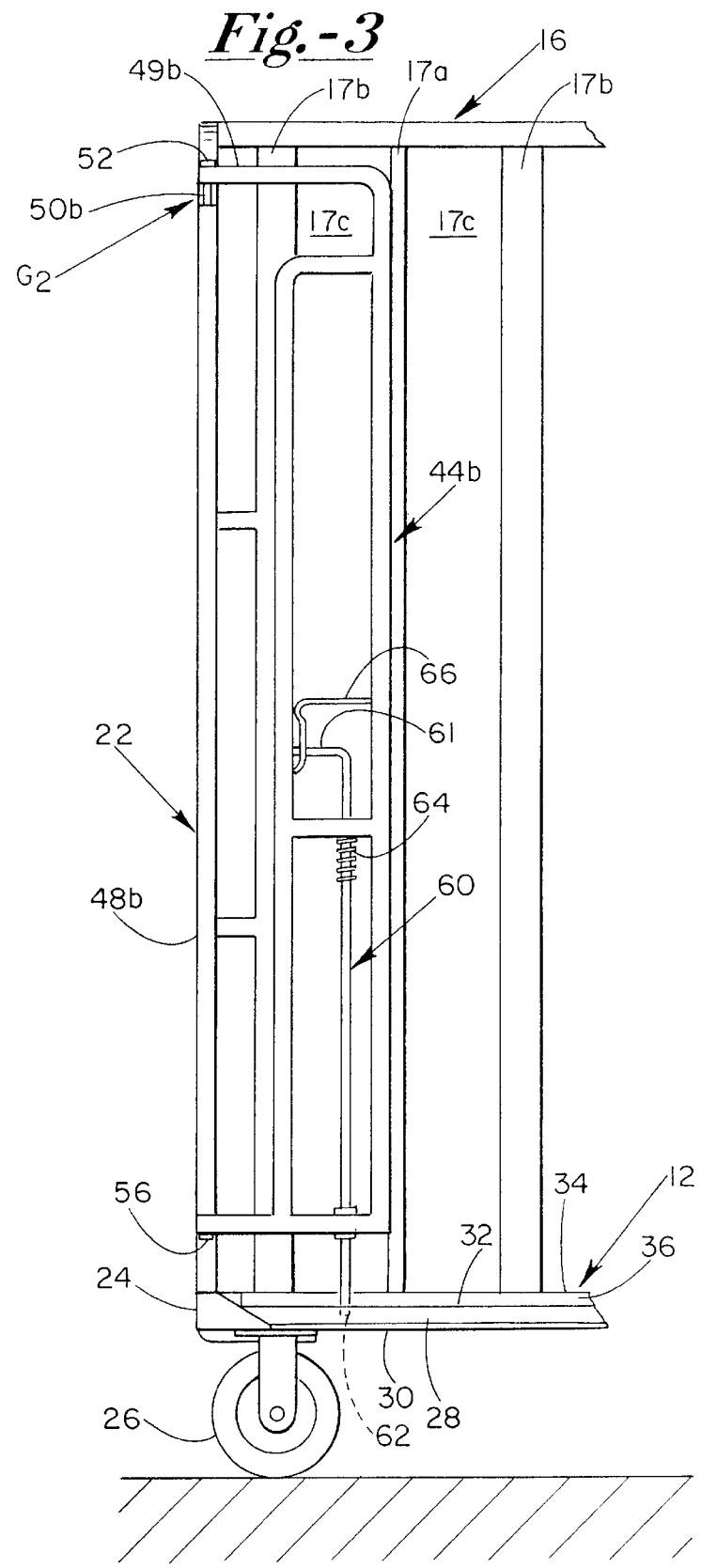
FIG. 3 shows a partial front plan view of the present invention.

Alternatively, as understood by referring to FIG. 3, doors 44a and 44b can be grasped by the framework thereof and lifted in their entirety so that pin ends 62 clear slots 38, 40 or 42. This manner of opening is possible because hinge rods 46 are longer than their respective channels 48a and 48b wherein a gap G1, as seen for example in FIG. 2, normally exists between door 44a and 44b and their respective channels 48a and 48b. After lifting to the position as seen in FIG. 3, a gap G2 is created between doors 44a and 44b and their respective channels 48a and 48b in which they extend. This travel distance between these two vertical door positions is of course sized to allow removal of pin ends 62 from slots 40 and 42 as well as from the lower positioned slots 38. This travel distance is related to the length of rods 46 with respect to channels 48a and 48b, and is limited by washers 52 and nuts 56. This manner of operating and positioning doors 44a and 44b is useful where goods are tightly packed within cart 10 and manipulation of rods 60 is made difficult by the presence of such good there against. Also, opening in this manner is more easily accomplished by automatic equipment.

Figure 4:
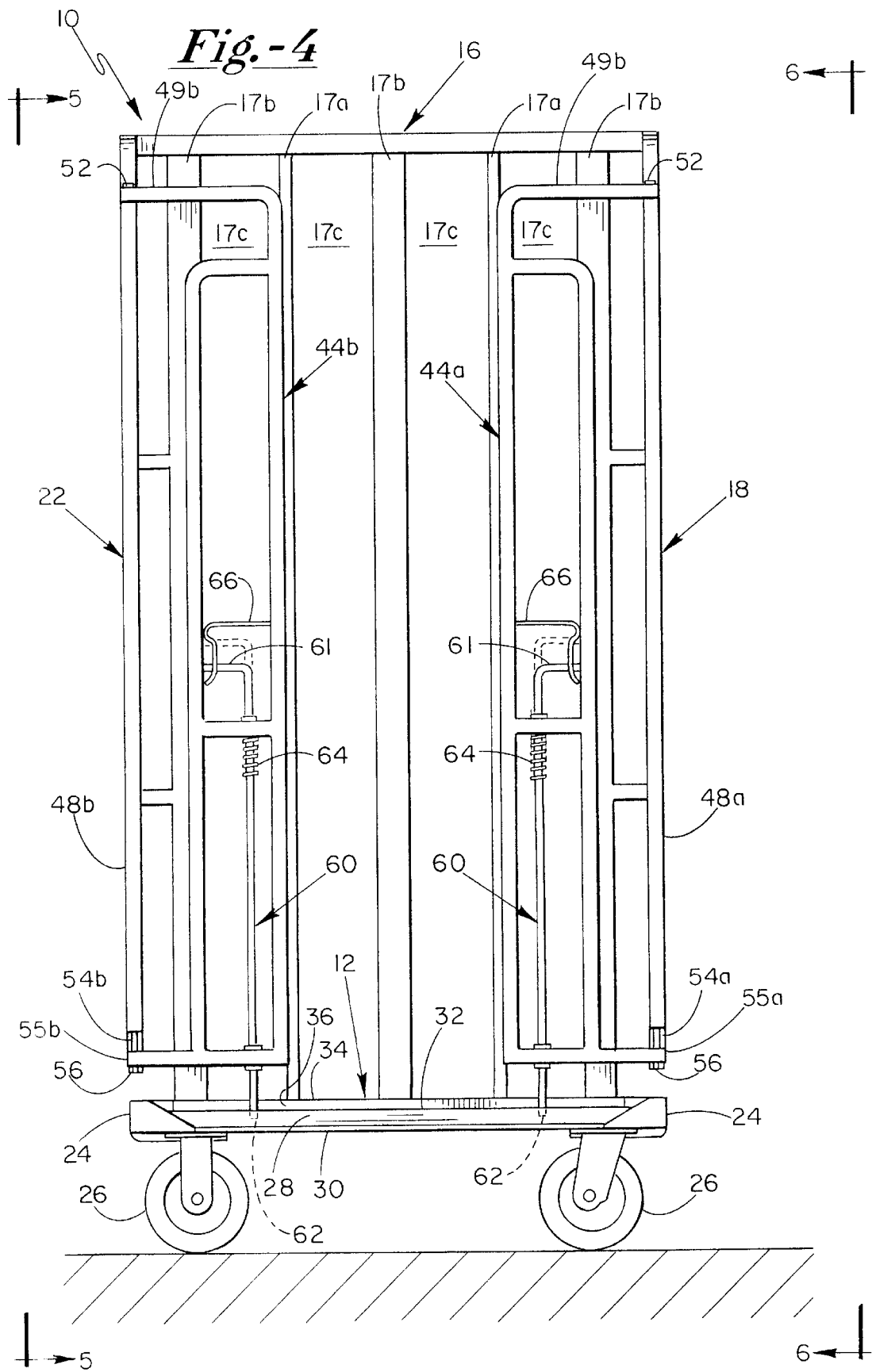
FIG. 4 shows a front plan view of the present invention.

A further manner of operating doors 44a and 44b involves closing them to the position as seen in FIG. 4 where pin ends 62 reside in slots 38. This can be accomplished quickly by slamming doors 44a and 44b to that position. When open, as with door 44b in FIG. 1, doors 44a and 44b can be grasped and quickly pushed closed. It will be appreciated by those of skill that, given sufficient momentum to overcome the downward biasing of springs 64, rod pin ends 62 will ride up along angled surfaces 28. When pin ends 62 reside over slots 38, they will immediately be inserted therein. It will also be understood that vertically extending surface 36 will prevent doors 44a and 44b from moving past shoulder 32 by contact with pin ends 62 thereby allowing sufficient time for pin ends 62 to "reside" above slots 38 so that they are inserted therein. Thus, pin ends 62 can not travel to a position above surface 34 resulting in insertion into slots 40 or 42. It will further be appreciated that angled surface 28 need not run along the entire length of base front edge 30, but could be a portion thereof being of sufficient width to provide for the needed angled contact area for both pins 62. Moreover, it will be appreciated that surface 36 essentially comprises a stop means for contacting pin ends 62 an preventing further door mvovement there beyond.

Therefore it will be understood by those of skill that various other stop means could be employed to block or otherwise interact with pin ends 62 for limiting further inward door movement. Thus, cart 10 is designed to specifically limit this fast slam closing approach to leave doors 44a and 44b in an orientation coextensive with shoulder 32. This position leaves cart 10 with the doors 44a and 44b thereof fixedly closed but automatically in the position that leaves the greatest amount of space within cart 10 for receiving goods. This situation is particularly of value where it is desired that cart 10 be loaded with both doors 44a and 44b closed, as from the top down. Such loading is facilitated by the particular structure of rear wall 16 wherein frame members 17a and 17b have no cross bracing therebetween. Thus, for example, forklift type tines could be inserted through spaces 17c of rear wall 16 at a top end thereof into cart 10. Such goods could then be loaded onto the tines and lowered to base 12. The tines could then be withdrawn and reinserted at the top end to add a further layer thereof into cart 10 on top of the first layer. After loading, doors 44a and 44b can be positioned inward by inserting of pin ends 62 thereof into slots 40 or 44. In this manner doors 44a and 44b can be used to more firmly hold the goods loaded in cart 10. This more firm positioning can be accomplished by moving of doors 44a and 44b by either of the two other methods described above.

Figure 5:
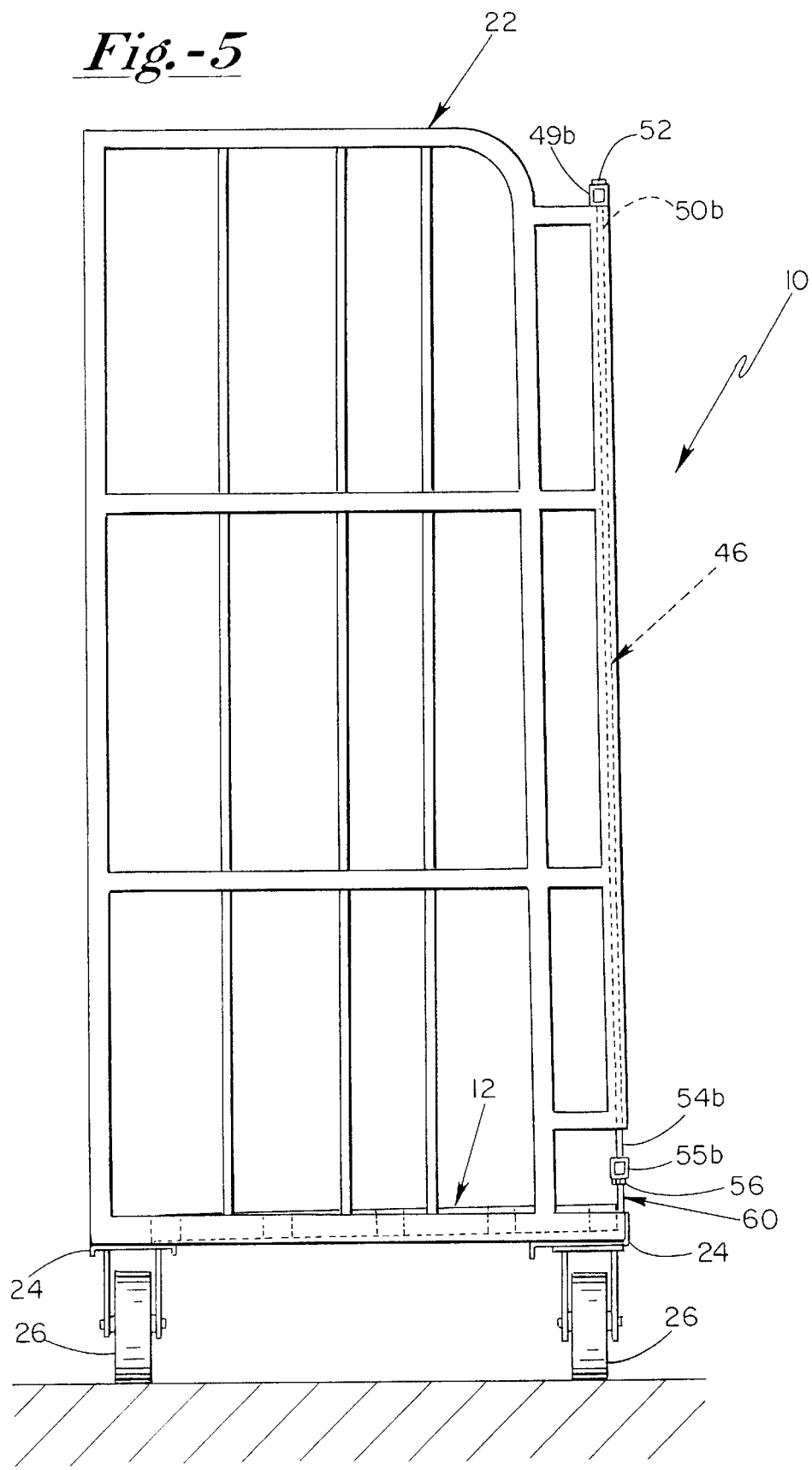
FIG. 5 shows a side plan view along lines 5—5 of FIG. 3.

As seen by referring to FIG. 5, base 12 is angled so that the front edge 30 thereof is held higher than the opposite end thereof that is secured by hinges 14 to frame piece 15. Also, as seen in FIG. 6, rear wall 16 exists at an angle that is not parallel with the substantially vertical orientation of walls 18 and 22. In fact, wall 16 and base 12 extend substantially at 90 degrees to each other. It will be understood by those of skill that this coordinated angled position of base 12 and rear wall 16 has the tendency to make goods loaded in cart 10 lean towards rear wall 16 and away from doors 44a and 44b. This is a desirable feature if the goods so loaded are uneven in shape and would have a tendency to fall out of cart 10 when doors 44a and 44b are opened.

As with other carts known in the prior art, cart 10, in its preferred embodiment can be folded into a more compact configuration, as is seen by referring to FIGS. 6 and 8. Specifically, base 12 can be folded up against rear wall 16 after which door 18 can be folded there against. It will be appreciated by those of skill that practice of the present invention does not require such folding ability. Thus, side walls 18 and 22, rear wall 16 and base 12 could form a fixed or rigid structure lacking, for example, hinges 14 and 20.

Figure 9:
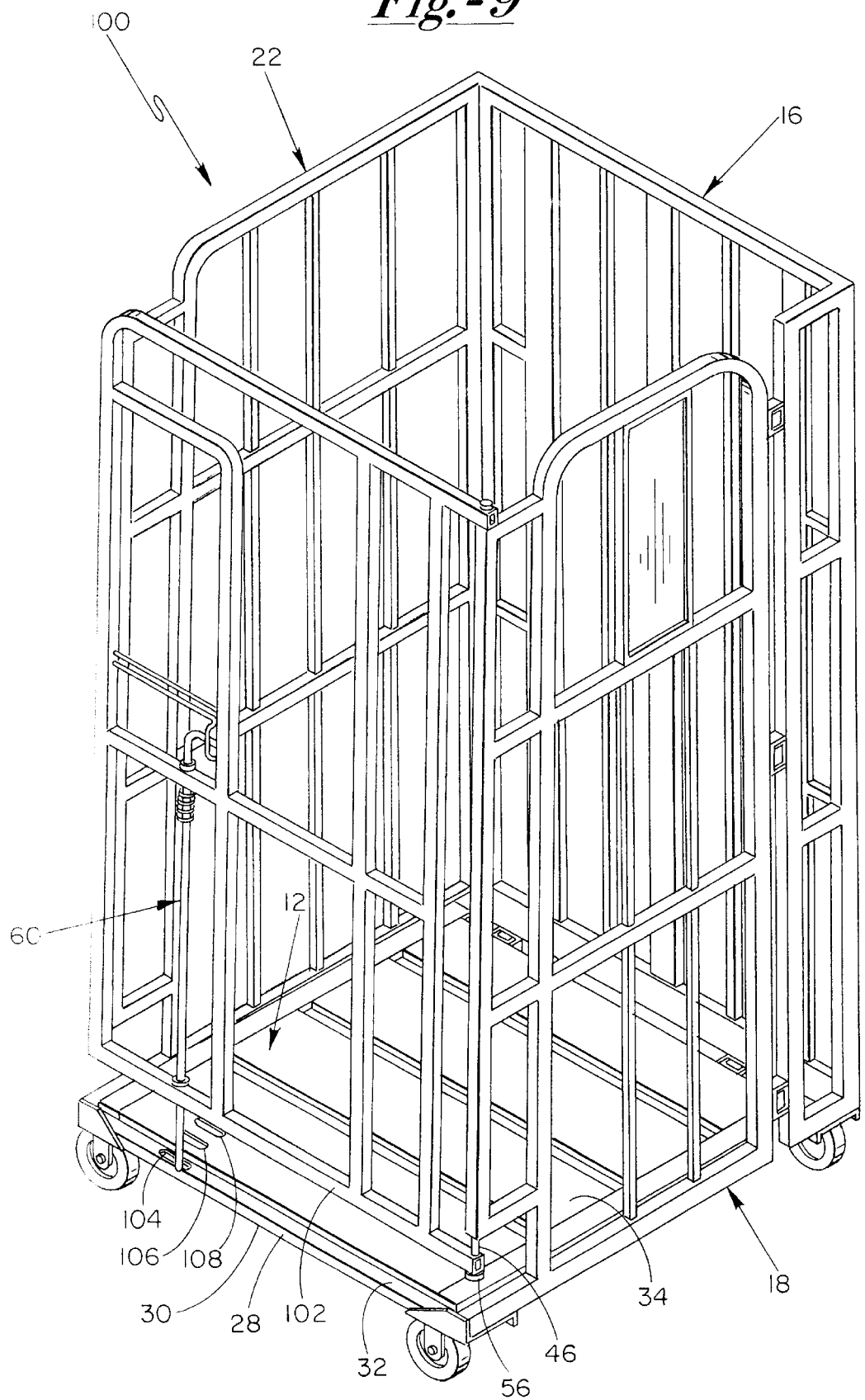
FIG. 9 shows a perspective view of a further embodiment of the present invention.

An alternate embodiment of the present invention is seen in FIG. 9, and generally referred to by the numeral 100. Cart 100 is the same as cart 10 in most respects, and for efficiency of description, the common elements there between are indicated by the same numerals. Cart 100 has one door 102 and one series of door stop slots 104, 106 and 108. Door 102 operates in the same manner as above described for doors 44*a* and 44*b*, i.e. it can be positioned by lifting thereof or operating of rods 60, and can be slammed to close whereby pin ends 62 reside in slots 104.

We claim:

1. A cart, comprising:

a base, the base having a plurality of wheels secured to a bottom surface thereof opposite from a top surface thereof and sidewalls secured to a portion of a perimeter of the base and extending upward there from defining an object retaining area having an open side, a door pivotally secured to a channel portion of the sidewalls by a hinge structure, the door pivotal from an open position inward to a first closed position for covering a portion of the open side, the base having an end portion extending below the door along a bottom end thereof when the door is in a first closed position, the base end portion having an angled front edge surface extending upward and between a lower horizontally extending front edge to a horizontally extending shoulder surface positioned at a level above the front edge and the shoulder surface extending from the angled surface to a vertical surface, the vertical surface extending upward from the shoulder surface to the base top surface and the shoulder surface having a first pin retaining slot, and the door including a moveable pin member slideably retained therein and the pin member having a normal lower position wherein a tip end thereof is positioned at a level just above the base front edge so that when the door is pivoted from the open position towards the first closed position with sufficient force the pin member tip end contacts the angled front edge surface riding thereon so that the pin member is moved slideably upward positioning the tip end at the level of the shoulder surface whereby the pin member is then positioned above the first pin retaining slot for permitting sliding downward insertion therein of the pin member tip end for retaining the door in the first closed position.

2. The cart as defined in claim 1, and the pin member biased in a downward direction.

3. The cart as defined in claim 1, and the pin member including a handle portion slideably retained in the door to facilitate manual retracting of the pin member.

4. The cart as defined in claim 1, and the hinge structure including means for permitting lifting of the door relative to the base so that the tip end of the pin member can be removed from the first slot by said lifting of the door without requiring upward sliding movement of the pin member.

5. The cart as defined in claim 4, and said means for permitting lifting of the door including a rod extending through the side wall channel portion and the door secured to the rod at top and bottom ends thereof and the rod having a length greater than that of the side wall end.

6. The cart as defined in claim 1, and the pin member slideable upward so that the tip end thereof is above the base top surface, and the top base surface having one or more second pin retaining slots there through for receiving the pin member tip end so that the door can be retained in one ore more second closed positions respectively.

7. The cart as defined in claim 6, and said means for permitting lifting of the door also permitting removal of the pin member tip end from the one or more second pin retaining slots without requiring upward sliding movement of the pin member.

8. The cart as defined in claim 2, and the pin member including a handle portion slideably retained in the door to facilitate manual retracting of the pin member.

9. The cart as defined in claim 8, and the hinge structure including means for permitting lifting of the door relative to the base so that the tip end of the pin member can be removed from the first slot by said lifting of the door without requiring upward sliding movement of the pin member.

10. The cart as defined in claim 9, and said means for permitting lifting of the door including a rod extending through the side wall channel portion and the door secured to the rod at top and bottom ends thereof and the rod having a length greater than that of the side wall end.

11. The cart as defined in claim 10, and the pin member slideable upward so that the tip end thereof is above the base top surface, and the top base surface having one or more second pin retaining slots there through for receiving the pin member tip end so that the door can be retained in one ore more second closed positions respectively.

12. The cart as defined in claim 11, and said means for permitting lifting of the door also permitting removal of the pin member tip end from the one or more second pin retaining slots without requiring upward sliding movement of the pin member.

13. A cart, comprising:

a base, the base having a plurality of wheels secured to a bottom surface thereof opposite from a top surface thereof and sidewalls secured to a portion of a perimeter of the base and extending upward there from defining an object retaining area having an open side, a pair of doors each pivotally secured to opposing channel portions of the sidewalls by hinge structures, each door pivotal from an open position inward to a first closed position for covering a portion of the open side, the base having an end portion extending below the doors along a bottom end thereof when each door is in a first closed position, the base end portion having an angled front edge surface extending upward and between a lower horizontally extending front edge to a horizontally extending shoulder surface positioned at a level above the front edge and the shoulder surface extending from the angled surface to a vertical surface, the vertical surface extending upward from the shoulder surface to the base top surface and the shoulder surface having a pair of first pin retaining slots, and each door including a moveable pin member slideably retained therein and each pin member having a normal lower position wherein a tip end thereof is positioned at a level just above the base front edge so that when each door is pivoted from the open position towards the first closed position with sufficient force the pin member tip end thereof contacts the angled front edge surface riding thereon so that the pin member is moved slideably upward positioning the tip end at the level of the shoulder surface whereby the pin member is then positioned above one of the first pin retaining slots for permitting sliding downward insertion therein of the pin member tip end for retaining the corresponding door in the first closed position.

14. The cart as defined in claim 13, and each pin member biased in a downward direction.

15. The cart as defined in claim 13, and each pin member including a handle portion slideably retained in the door to facilitate manual retracting of the pin member.

16. The cart as defined in claim 13, and each hinge structure including means for permitting lifting of the corresponding door relative to the base so that the tip end of the pin member thereof can be removed from its first slot by said lifting of the door without requiring upward sliding movement of the pin member.

17. The cart as defined in claim 16, and said means for permitting lifting of each door including a rod extending through the corresponding side wall channel portion and each door secured to its corresponding rod at top and bottom ends thereof and each rod having a length greater than that of its respective side wall end.

18. The cart as defined in claim 13, and each pin member slideable upward so that the tip end thereof is above the base top surface, and the top base surface having one or more corresponding pairs of second pin retaining slots there through for receiving each pin member tip end so that the doors can be retained in one ore more second closed positions respectively.

19. The cart as defined in claim 18, and said means for permitting lifting of each door also permitting removal of the corresponding pin member tip end thereof from the one or more second pin retaining slots without requiring upward sliding movement of the pin member.

20. The cart as defined in claim 14, and each pin member including a handle portion slideably retained in the door to facilitate manual retracting of the pin member.

21. The cart as defined in claim 20, and each hinge structure including means for permitting lifting of the corresponding door relative to the base so that the tip end of the pin member thereof can be removed from its first slot by said lifting of the door without requiring upward sliding movement of the pin member.

22. The cart as defined in claim 21, and said means for permitting lifting of each door including a rod extending through the corresponding side wall channel portion and each door secured to its corresponding rod at top and bottom ends thereof and each rod having a length greater than that of its respective side wall end.

23. The cart as defined in claim 22, and each pin member slideable upward so that the tip end thereof is above the base top surface, and the top base surface having one or more corresponding pairs of second pin retaining slots there through for receiving each pin member tip end so that the doors can be retained in one ore more second closed positions respectively.

24. The cart as defined in claim 22, and said means for permitting lifting of each door also permitting removal of the corresponding pin member tip end thereof from the one or more second pin retaining slots without requiring upward sliding movement of the pin member.

* * * * *